C. L. DELAY.
ROTARY HARROW.
APPLICATION FILED JULY 8, 1918.
1,296,777.
Patented Mar. 11, 1919.
2 SHEETS—SHEET 1.
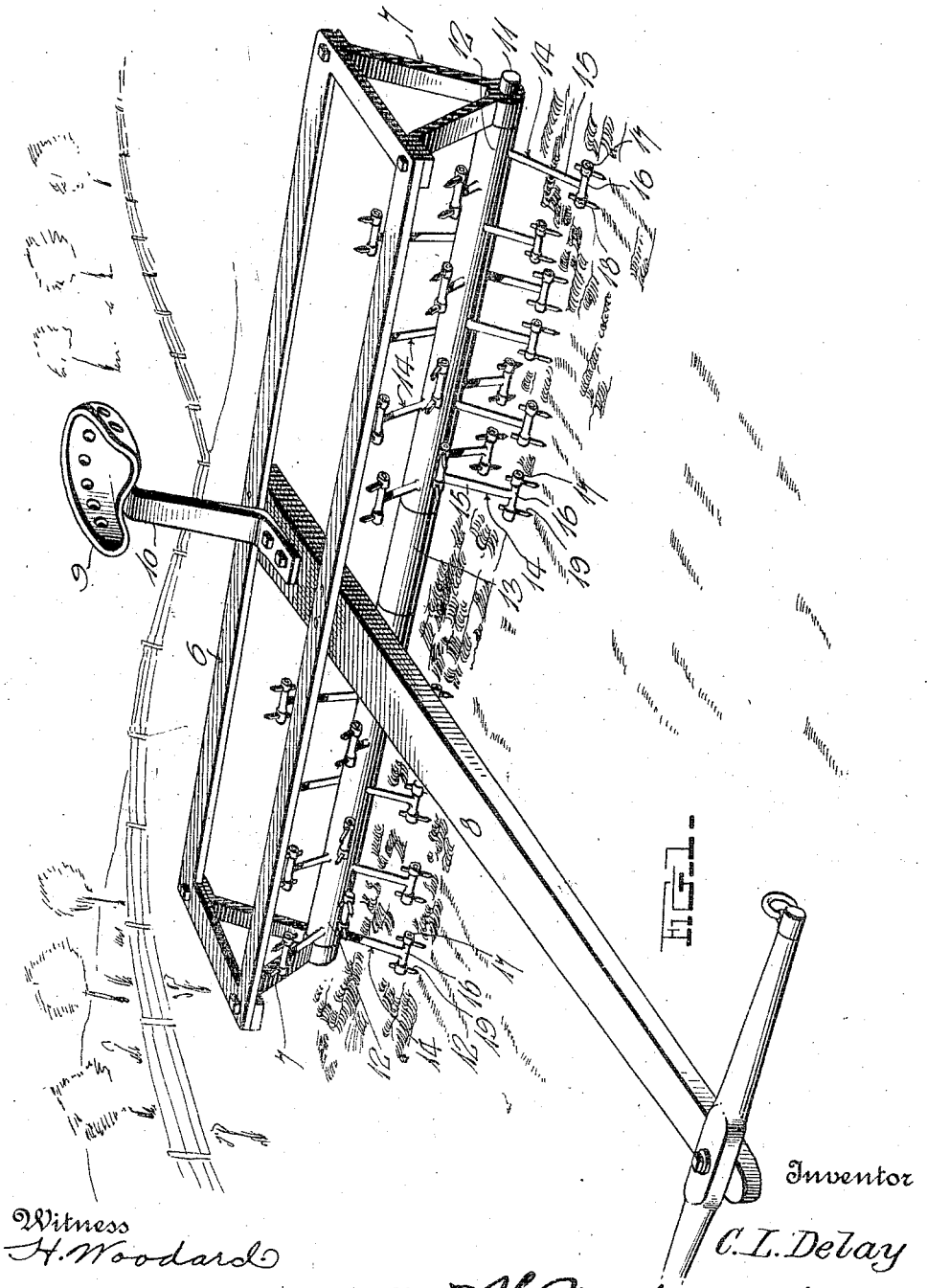
Witness
H. Woodard
Inventor
C. L. Delay
By H. R. Willson &co.
Attorneys

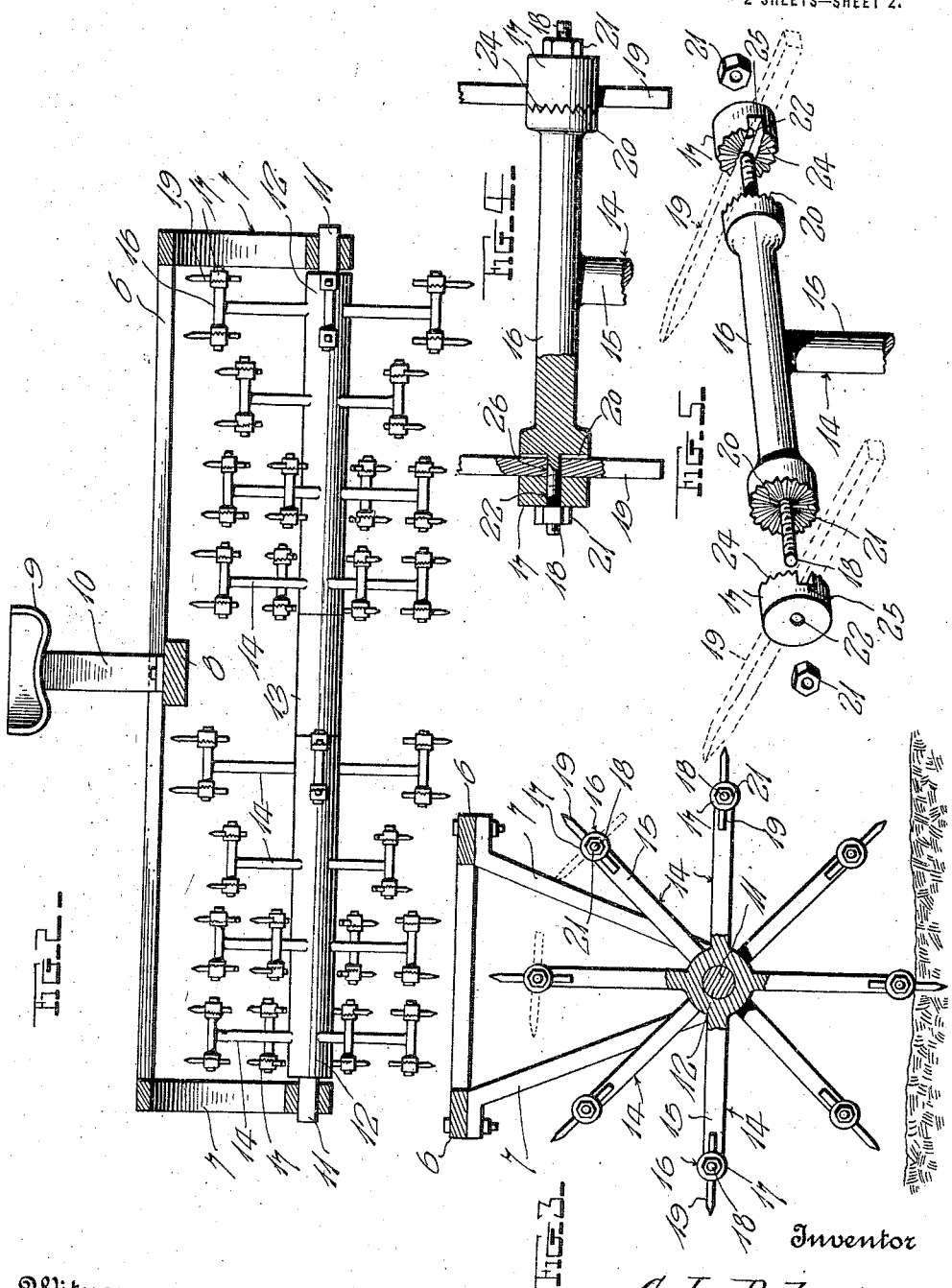

UNITED STATES PATENT OFFICE.

CLYDE L. DELAY, OF SANDBORN, INDIANA.

ROTARY HARROW.

1,296,777.  Specification of Letters Patent.  Patented Mar. 11, 1919.

Application filed July 8, 1918. Serial No. 243,792.

*To all whom it may concern:*

Be it known that I, CLYDE L. DELAY, a citizen of the United States, residing at Sandborn, in the county of Knox and State of Indiana, have invented certain new and useful Improvements in Rotary Harrows; and I do declare the following to be a full, clear, and exact description of the invention, such as will enable others skilled in the art to which it appertains to make and use the same.

This invention relates to rotary harrows, and more particularly to an improved combined harrow and cultivator.

One of the objects of this invention is to provide a device of this character which thoroughly pulverizes clods without unnecessarily packing the soil under the clods;

Another object is to provide a tilling device of this character which penetrates and loosens up the soil when the latter has become packed or baked, thus performing the functions of a cultivator as well as of a harrow;

Another object is to provide a tilling device of this character which will not drag and accumulate weeds, grass or trash, but leaves the same scattered for enriching the soil;

Another object is to provide an improved adjustable harrow-tooth-holder, by which the teeth may be set at different angles according to the condition of the soil to be harrowed or otherwise tilled.

Other objects and advantages may become apparent to persons who read the following details of description in connection with the accompanying drawings, in which:

Figure 1 is a perspective view of my improved drilling device;

Fig. 2 is a view showing the frame in vertical section and showing the remainder of the device in elevation;

Fig. 3 is an enlarged transverse vertical sectional view;

Fig. 4 is an enlarged detail view partly in section; and—

Fig. 5 is a detail perspective view which shows more clearly the structure disclosed in Fig. 4.

In these drawings, in which similar reference characters correspond with similar parts throughout the several views, the main frame of the device comprises an open rectangular frame 6 and a pair of substantially V-shaped bearing elements 7, the latter being secured by bolts or other suitable means to the respective ends of the frame 6 so as to support the latter. A tongue or shaft element 8 is secured to the middle part of the frame 6 by any appropriate means, and a seat 9 is supported on the tongue by means of a spring 10.

A shaft 11 may be rotatably or fixedly mounted on the bearings 7, and when it is fixedly mounted, a pair of harrow shafts 12 are rotatable thereon. An additional shaft 13 may be interposed between the inner ends of the shafts 12, and this shaft or collar 13 may be removed and replaced by a shaft similar to the shafts 12 which have arms 14 extending radially therefrom. As shown in the drawings, however, the shafts 12 rotate independently of one another, so as to facilitate the easy turning of the harrow about a vertical axis, and the shaft 13 provides a space between the radial tilling elements of the shafts 12, so that a row of growing vegetables or crops may be straddled while the soil on opposite sides thereof is being tilled by said tilling elements; but when the device is used as a harrow, the members 12 may be brought into juxtaposition so as to close the space which is provided by the elements 13, or, as previously mentioned, a separate element similar to the elements 12 may replace the element 13.

The elements 14 are preferably arranged in separate groups or annular series, and although the drawings disclose four of these elements in each series, it is to be understood that a series may consist of a greater or smaller number of these elements. Each tilling element 14 comprises an arm 15, a cross-bar 16, securing elements 17, bolts or studs 18 and tilling teeth 19. Each cross-bar 16 is radially corrugated at 20 and provided with the studs 18 and nuts 21. The studs 18 extend through apertures 22 of the securing elements and coöperates with the nut 21 for holding the corrugations 20 in mesh with corresponding corrugations 24 which are formed on the elements 17. Each of the elements 17 is provided with a recess or radial slot 25 which constitutes a seat for one of the harrow teeth or tilling elements 19, the latter being apertured at 26 to receive the studs or bolts 18. It will be seen, therefore, that when the parts 15 to 25 are assembled as shown in Fig. 4, the bolts 18 and nuts 23 coöperate with the radially corrugated elements 16 and 17 for securing the harrow teeth 19 rigidly at any one of the many angles of adjustment which correspond with the angles of the corrugations 20 and 24. In other words, the harrow teeth 19 may be arranged either parallel with the elements 15, at right angles thereto, or at different angles between the parallel and right angled adjustments. Therefore, the device may be used either as a means for spading or loosening the soil, or as a means for packing the soil while pulverizing the clods thereof.

In order to facilitate the ease of operation, and to obtain the maximum efficiency, I prefer arranging the arms 15 of each series in staggered relation to those of the next adjacent series, although this device has been illustrated with a comparatively few annular series of tilling elements 14, it is to be understood that any appropriate number of series may be employed, and that this invention is not limited to the exact details of construction and arrangement of parts described and shown, but I am entitled to make changes within the scope of the inventive idea disclosed in the foregoing description and following claims.

What I claim as my invention is:

1. The combination in a tilling device of a rotary element, a plurality of radial arms thereon, a plurality of tilling teeth on each of said arms, and means on said arms whereby each of said teeth may be moved into and held in angular adjustments relative to said radial arms.

2. The combination in a tilling device of a rotary element, a plurality of radial arms thereon, a plurality of tilling teeth on each of said arms, and means on said arms whereby each of said teeth may be moved into and held in angular adjustments relative to its fellow tooth.

3. The combination in a tilling device, of a rotary shaft, a plurality of annular series of arms thereon, each arm of one series extending radially from the shaft, a cross-bar for each of said arms, each cross-bar being parallel with the axis of said shaft, and a plurality of tilling teeth on each cross-bar.

4. The combination in a tilling device, of a rotary shaft, a plurality of annular series of arms thereon, each arm of one series extending radially from the shaft, a cross-bar for each of said arms, each cross-bar being parallel with the axis of said shaft, a plurality of tilling teeth on each cross-bar, and means whereby each of the teeth may be angularly adjusted independently of the other.

5. A tilling element comprising an arm, a cross-bar on said arm and having radially corrugated ends, a pair of tilling teeth, a pair of securing-and-adjusting elements each having a radially corrugated side and provided with a tilling-tooth-seat which opens through the radially-corrugated side, each of said teeth being seated in one of the tilling-tooth-seats, and means coöperative with said securing-and-adjusting elements and with the corrugations of said cross-bar for effecting different adjustments of said teeth relative to said arm.

In testimony whereof I have hereunto set my hand.

CLYDE L. DELAY.

Copies of this patent may be obtained for five cents each, by addressing the "Commissioner of Patents, Washington, D. C."